United States Patent
Mokhtari (10) Patent No.: US 8,191,952 B2
(45) Date of Patent: Jun. 5, 2012

(54) DEVICE CAPABLE OF MODULATION BY EXPANSION OR COMPACTION FOR FORMING A PROTECTION AND TRANSPORT STRUCTURE AT THE BACK AND AT THE HEIGHT OF THE ROOF OF THE PASSENGER COMPARTMENT OF AN AUTOMOTIVE VEHICLE

(76) Inventor: Malik Mokhtari, Aytre (FR); Lucie Mokhtari, legal representative, Aytré (FR); Emmanuel Mokhtari, legal representative, Aytré (FR)

( * ) Notice: Subject to any disclaimer, the term of this patent is extended or adjusted under 35 U.S.C. 154(b) by 214 days.

(21) Appl. No.: 12/448,705

(22) PCT Filed: Dec. 27, 2007

(86) PCT No.: PCT/FR2007/002178
§ 371 (c)(1),
(2), (4) Date: Jan. 11, 2010

(87) PCT Pub. No.: WO2008/102080
PCT Pub. Date: Aug. 28, 2008

(65) Prior Publication Data
US 2011/0127790 A1    Jun. 2, 2011

(30) Foreign Application Priority Data
Jan. 2, 2007    (FR) ...................... 07 00029

(51) Int. Cl.
*B60R 9/00*    (2006.01)

(52) U.S. Cl. .............................. 296/3; 280/756; 224/405
(58) Field of Classification Search ............... 296/183.1, 296/190.03, 306, 26.07, 26.11, 3; 280/756; 224/405; 414/498, 499, 500
See application file for complete search history.

(56) References Cited

U.S. PATENT DOCUMENTS

| | | | |
|---|---|---|---|
| 4,659,131 A | 4/1987 | Flournoy, Jr. ..................... | 296/3 |
| 4,770,458 A | 9/1988 | Burke et al. ..................... | 296/3 |
| 4,854,628 A * | 8/1989 | Halberg .......................... | 296/3 |
| 5,152,570 A | 10/1992 | Hood ............................. | 296/3 |
| 5,190,337 A | 3/1993 | McDaniel ........................ | 296/3 |
| 5,316,190 A * | 5/1994 | Bullock .......................... | 224/405 |
| 5,743,583 A | 4/1998 | Lowe ............................. | 296/3 |
| 6,598,922 B2 * | 7/2003 | Morse et al. ................. | 296/26.02 |
| 6,655,722 B2 * | 12/2003 | Bareket .......................... | 296/3 |
| 6,676,220 B2 * | 1/2004 | Mistler ......................... | 298/1 A |
| 7,296,836 B1 * | 11/2007 | Sabo ............................. | 296/3 |
| 7,641,251 B1 * | 1/2010 | Stepanians ..................... | 296/3 |

OTHER PUBLICATIONS

Int'l Search Report from corresponding WIPO Publication No. WO 2008/102080 A1, dated Aug. 28, 2008; 3 pages.

* cited by examiner

*Primary Examiner* — Jason S Morrow
(74) *Attorney, Agent, or Firm* — Kusner & Jaffe (57) ABSTRACT

A device that can be modulated by being extended or retracted:
  to form a structure for protective and transport purposes at the rear of a motor vehicle and at the height of its cab roof; or
  to fold partially vertically and partially horizontally behind the front seats.

7 Claims, 9 Drawing Sheets

DEVICE CAPABLE OF MODULATION BY EXPANSION OR COMPACTION FOR FORMING A PROTECTION AND TRANSPORT STRUCTURE AT THE BACK AND AT THE HEIGHT OF THE ROOF OF THE PASSENGER COMPARTMENT OF AN AUTOMOTIVE VEHICLE

RELATED APPLICATIONS

The present invention is a 35 U.S.C. 371 of PCT/FR2007/002178, filed on Dec. 27, 2007, which claims the benefit of: French Patent Application No. 07 00029, filed on Jan. 2, 2007.

FIELD OF THE INVENTION

The present invention relates to a device that can be modulated by being extended or retracted:
to form a structure for protective and transport purposes at the rear of a motor vehicle and at the height of its cab roof; or
to fold partially vertically and partially horizontally behind the front seats.

BACKGROUND OF THE INVENTION

Traditionally, this type of device is rather awkward to put into position and/or not very strong and/or bulky. In addition, the structures of such devices are of the non-deformable type, which means that if the device is used to transport a load, then in the event of a front impact, the load is propelled violently by kinetic energy.

SUMMARY OF THE INVENTION

The device of the invention remedies those drawbacks since it comprises:
a front support at substantially the height of the cab roof and fastened to the vehicle.
The top of this support constitutes a shape in which a frame can slide parallel to the long direction of the vehicle and can oscillate about an axis perpendicular to the long direction of the vehicle until it is horizontal on reaching its maximum possible amount of rotation. This sliding movement of the frame that enables its long dimension defined by its hinge points to be varied, is found to be necessary to enable the device to be deployed.
a central support constituting a kind of arch made up of two arms and a central section:
that extends across the vehicle perpendicularly to its long direction;
that is hinged via the ends of its arms to the sides of the vehicle substantially at the center of the length defined by the base of the front support and the rear of the vehicle;
that oscillates about an axis perpendicular to the length of the vehicle; and
that includes on its two arms axes that relay its movement to hinge supports, in proportion to the stroke thereof.
The length of the arms of this oscillating central support and the positioning of its hinges on the sides of the vehicle are such that the central section may be positioned at the front or at the rear of the device at a height equivalent to the height of the front support. This central oscillating support constitutes the structure on which the high frame of the device is hinged and on which it bears at a point situated between the oscillation axes of the central support and the axes that connect the frame thereto.
a frame:
that is made up of two elements that are hinged together at one end so as to be capable of folding one in the other;
that forms, when unfolded, substantially at the height of the vehicle roof, a load-carrying and/or protective structure of area that extends from the rear of the vehicle to above the cab and of length that is greater than the size of its support.
This high frame is hinged via the rear to the oscillating support so as to be capable of oscillating perpendicularly to the length of the vehicle. The positioning of the hinges connecting the oscillating support with the frame is such that when the device is folded, the rear of the high frame comes to the height of the central section of the supports, and when the device is unfolded, the frame is above the central section of the supports. The front of the high frame is connected to its front support in such a manner as to be capable of oscillating and sliding perpendicularly to the length of the vehicle, which movements are necessary for changing the position of the device.
two (right and left) rear supports:
that are connected to the (right and left) rear sides of the vehicle via hinges enabling them to oscillate perpendicularly to the length of the vehicle;
that are coupled with the oscillating central support to support it;
that are decoupled from the oscillating central support in order to fold down into the vehicle; and
that are provided with respective axes that relay their movements to the oscillating central support in proportional to the amplitude of the stroke thereof.
two links driving simultaneous oscillation of the oscillating central support and its hinged rear supports.
two plates connecting the oscillating central support to the high frame and enabling it to oscillate, and in which it slides when the plates cut the breakable projections that prevent it from moving in translation.
The locking of the movement of the device of the invention, necessary to enable it to be used on a moving vehicle, is obtained by inserting a pin that connects the oscillating central support to its hinge rear support or that prevents the movement of the hinge elements. Plates in which the frame engages prevent it from moving when the device is folded.
Thus, the device of the invention forms:
a load-carrying and/or protective rigid high frame having a surface that extends from the rear of the vehicle to above the cab:
that bears so as to be held at substantially the height of the vehicle roof, on rear supports having bases that are distributed on three lines extending across the width of the vehicle; and
that uses its kinetic energy in shearing; or
structure that is partially vertical and partially horizontal, retracted to behind the front seats, with a more or less vertical portion that protects the cab and does not project beyond the height of the front support.
The links connecting the oscillating central support to the hinged rear supports automatically ensure simultaneous oscillation of these elements, thereby limiting the handling thereof and ensuring that they are always properly positioned.
The oscillation movement ratios generated by the particular positioning of the axes of the links on the oscillating central support and the hinged rear supports provides a difference in amplitude between their simultaneous strokes.

Thus, by acting on their transmission ratios, the positioning of these elements can be optimized, both in terms of overall size and in terms of solidity.

The frame bearing directly on the oscillating central support, thereby ensuring that it is positioned automatically and held in horizontal position, avoids extra manipulation and provides good strength.

The sliding movement of the high frame on the front support, caused by its bearing on the central support and by oscillation thereof, by varying the long dimension defined by the three oscillation axes (front, rear, central) of the frame, serves not only to enable it to fold in half for being stored vertically behind the cabin, whereas when unfolded bending thereof is prevented by the oscillating central support, but also enables it to go forwards beyond its support to provide an area of considerable length while maintaining good strength, whereas when folded it does not extend beyond the height of its support.

This particular structure for the device enables the elements making it up to form a linkage. Thus, by the effect of pressure giving rise:

either to oscillation of the central support or one of the rear supports; or else to movement in translation of a transmission link;
the device of the invention changes shape to be positioned:
either retracted to the front, its frame being folded in half more or less vertically, not projecting beyond the front support nor beyond the oscillating central support having its hinged rear supports folded so as to limit the space they occupy; or else above the cabin and at the rear of the vehicle at a height that is substantially equivalent to the height of the roof, its frame being held horizontal and stiffened by the support provided thereto by the oscillating central support that is itself held by its hinged support.

In the unfolded position, the linkage of the device of the invention tends to be blocked by the force of gravity acting between the front and rear oscillation axes of the frame, since the central support comes into abutment on its hinge support and the natural bending of the frame about its central oscillation axis is prevented by the central support at a point situated between its oscillation axes and by its axes connecting it thereto. Thus, the force of gravity opposes oscillatory movements of the device of the invention, thereby imparting natural stability thereto and enabling the stresses that the locking system needs to withstand to be reduced.

In the event of a front impact, the movement in translation of the high frame in its rear plates, during which movement the plates cut through the projections that impede this movement, has the effect of providing damping enabling the frame to use up progressively the kinetic energy due to the movement of the vehicle by shearing through its own projections.

In particular embodiments:

wheels contribute to forming the sliding shape for the front support;

the oscillation of the links of the front support is limited by abutments so that the force of gravity exerted by the portion of the frame projecting in front of the front support does not affect the linkage of the device;

the links of the front support are retained by springs exerting a force directed towards the bottom of the device;

the hinged rear supports of the oscillating central support may be provided with offset link fastenings beneath their oscillation axes, thereby reducing overall size;

the central oscillation of the frame may be limited by abutments (not shown);

the flanks of the front high half-frame may constitute the wheel rails;

with a link on the front support, pegs placed thereon reinforce the lateral guidance of the high frame (not shown);

a hydraulic thrust actuator placed either on the oscillating central support or on a hinged rear support, or on a link interconnecting these elements, is used to drive the linkage of the device of the invention, and to lock it;

the high frame and/or the oscillating central support are structured so that when the high frame slides in the rear plate, it is held horizontal (feature not shown);

the bed body or the cab of the vehicle constitutes the front support (feature not shown);

the high frame has a solid surface that constitutes a kind of roof (feature not shown);

the high frame constitutes the roof of the cab (feature not shown);

the high frame forms or is provided with a rail on which there travels, when the device is unfolded, a hoist or any other lifting tackle so as to make it easy to position a load in the bed body of the vehicle (feature not shown);

the device does not include a high frame, thereby reducing its bulk and its cost of fabrication, but eliminating the advantages that the frame would normally provide (load-carrying capacity or rigid coverage, feature not shown);

the device may constitute part of the rear walls of the cab (feature not shown);

the hinged rear supports support the frame (feature not shown); and the hinged rear supports are united to form a single element (feature not shown).

BRIEF DESCRIPTION OF THE DRAWINGS

The accompanying drawings illustrate the invention.

Note: in these two FIGS. 3 and 4) the side of the bed body and the plate are not shown in order to make the device easier to see.

Figure 1:
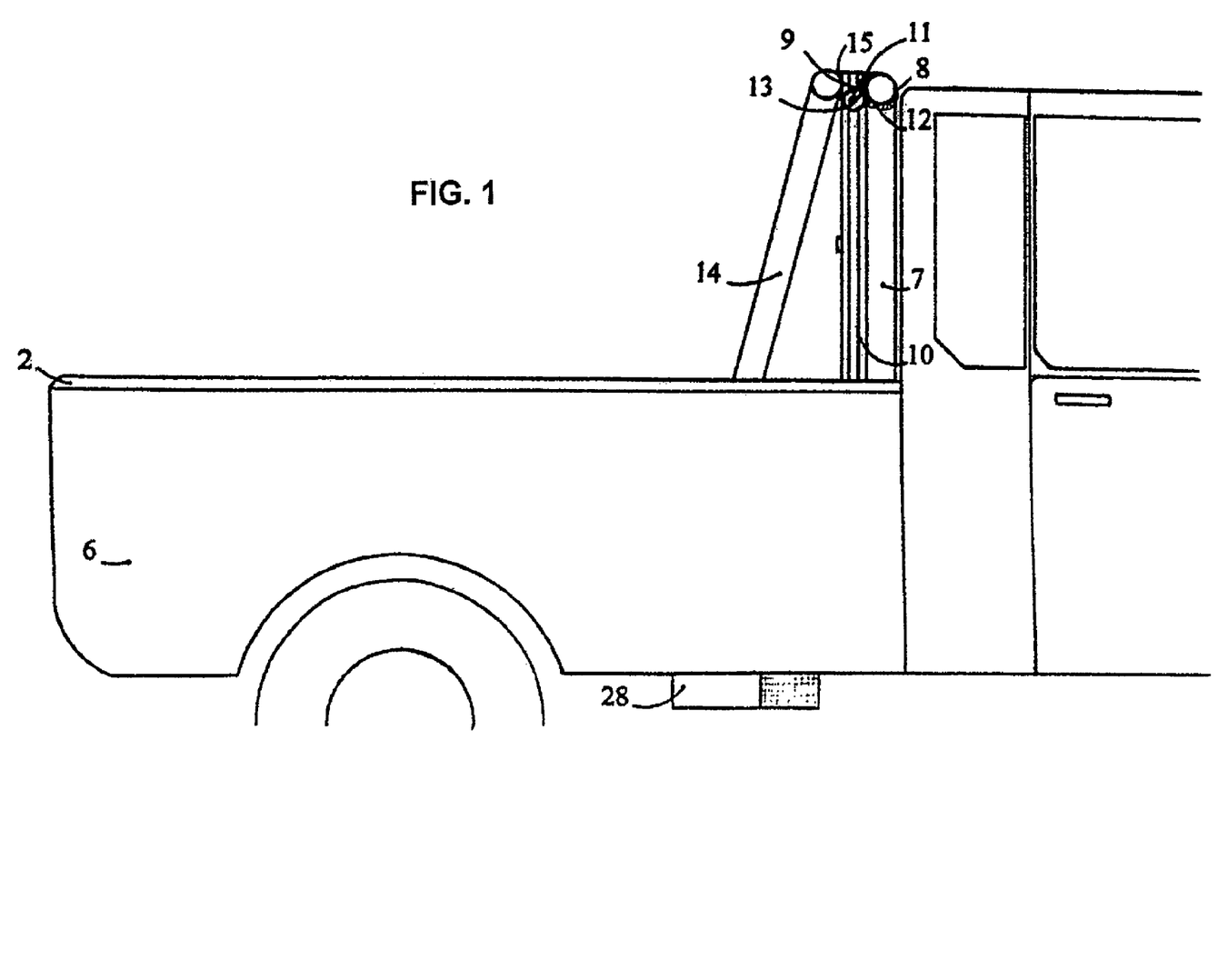
FIG. 1 shows the folded device seen from the side in the vehicle.
Figure 2:
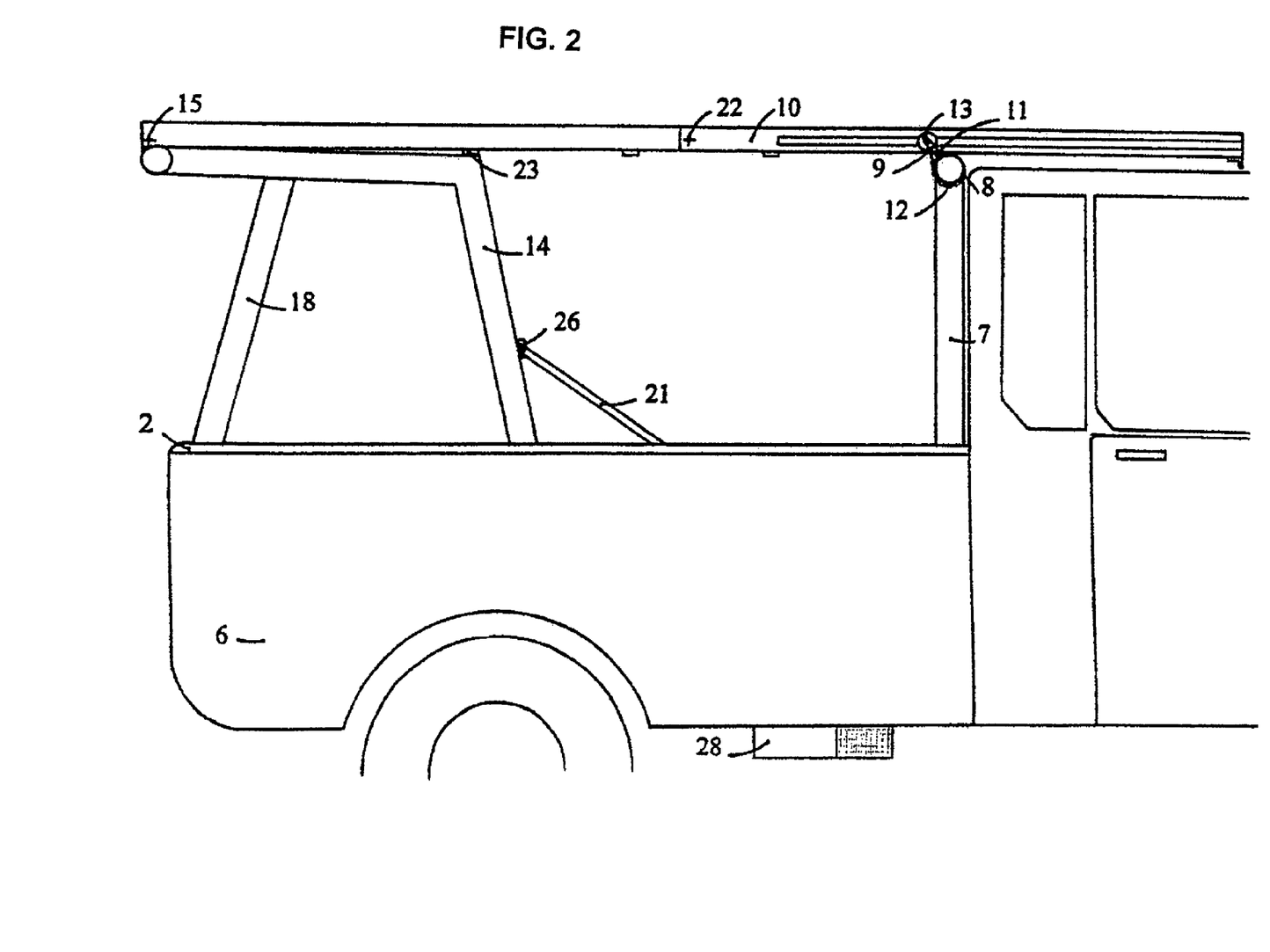
FIG. 2 shows the unfolded device seen from the side in the vehicle.
Figure 3:
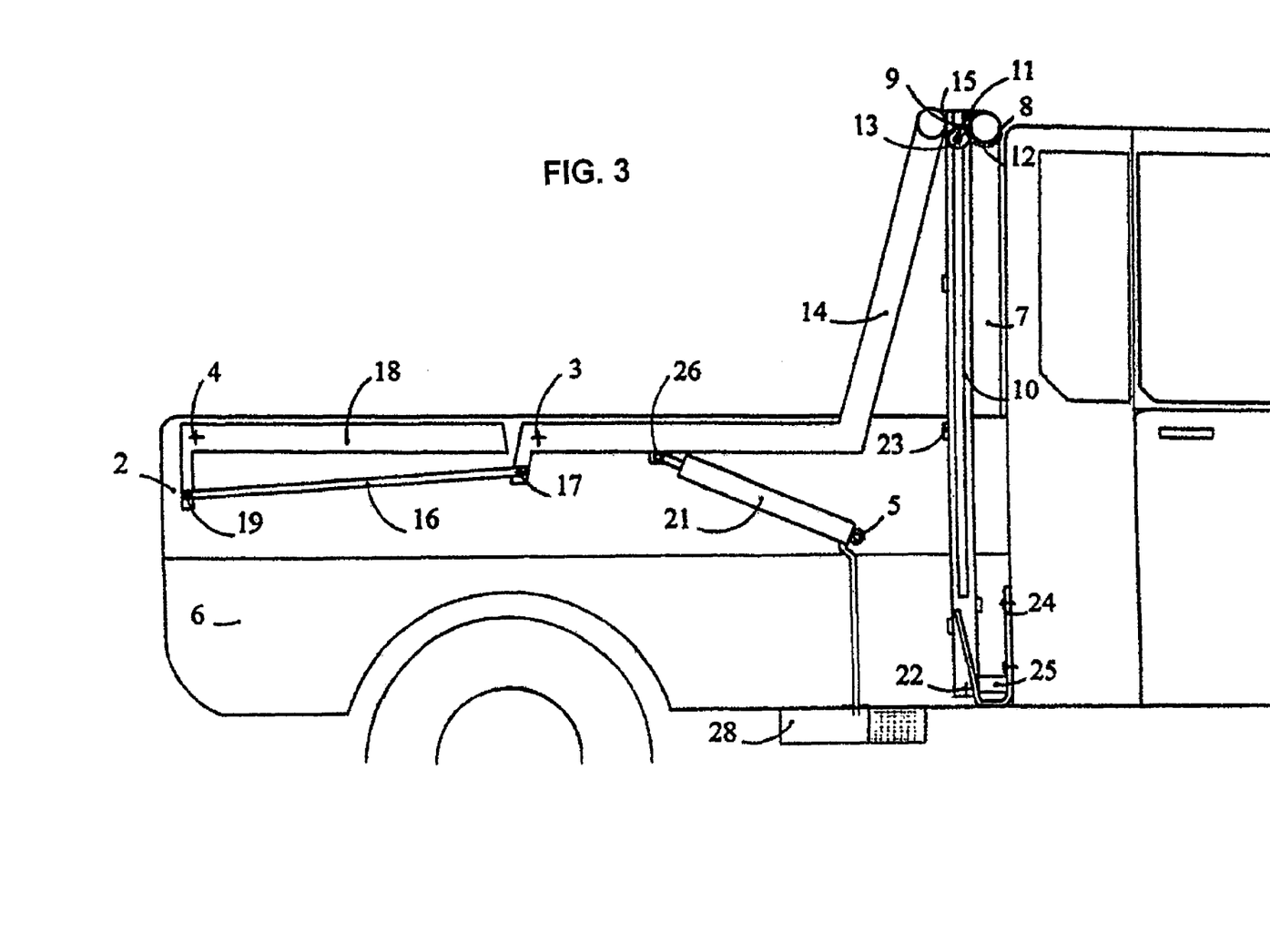
FIG. 3 shows the folded device seen from the side in the vehicle, with the side of the bed body and also the plate used for interconnecting the various elements that would normally appear in the foreground being invisible.
Figure 4:
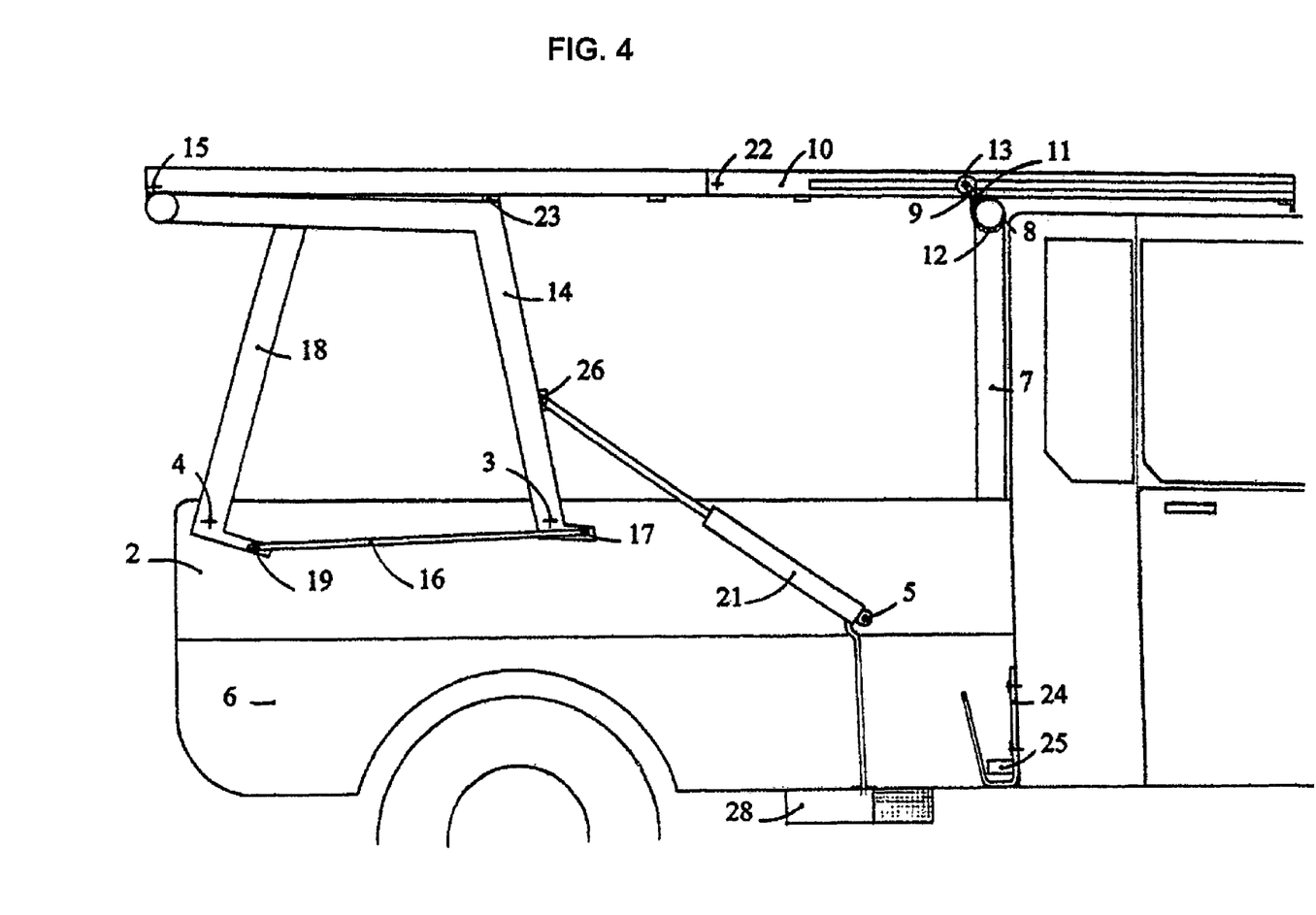
FIG. 4 shows the unfolded device seen from the side in the vehicle, with the side of the bed body and also the plate for interconnecting the various elements that would normally appear in the foreground being invisible.
Figure 5:
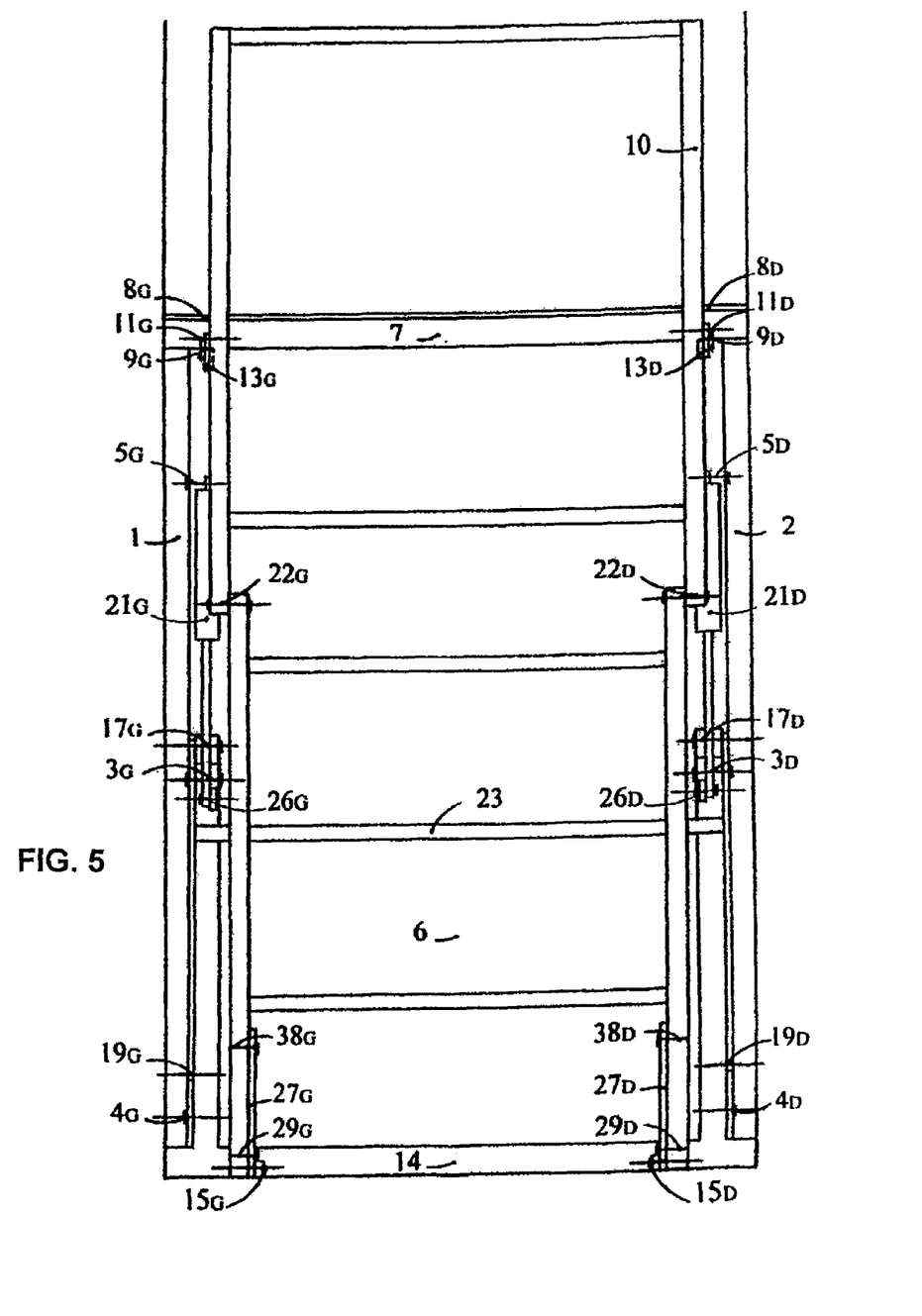
FIG. 5 shows the unfolded device seen from above.
Figure 6:
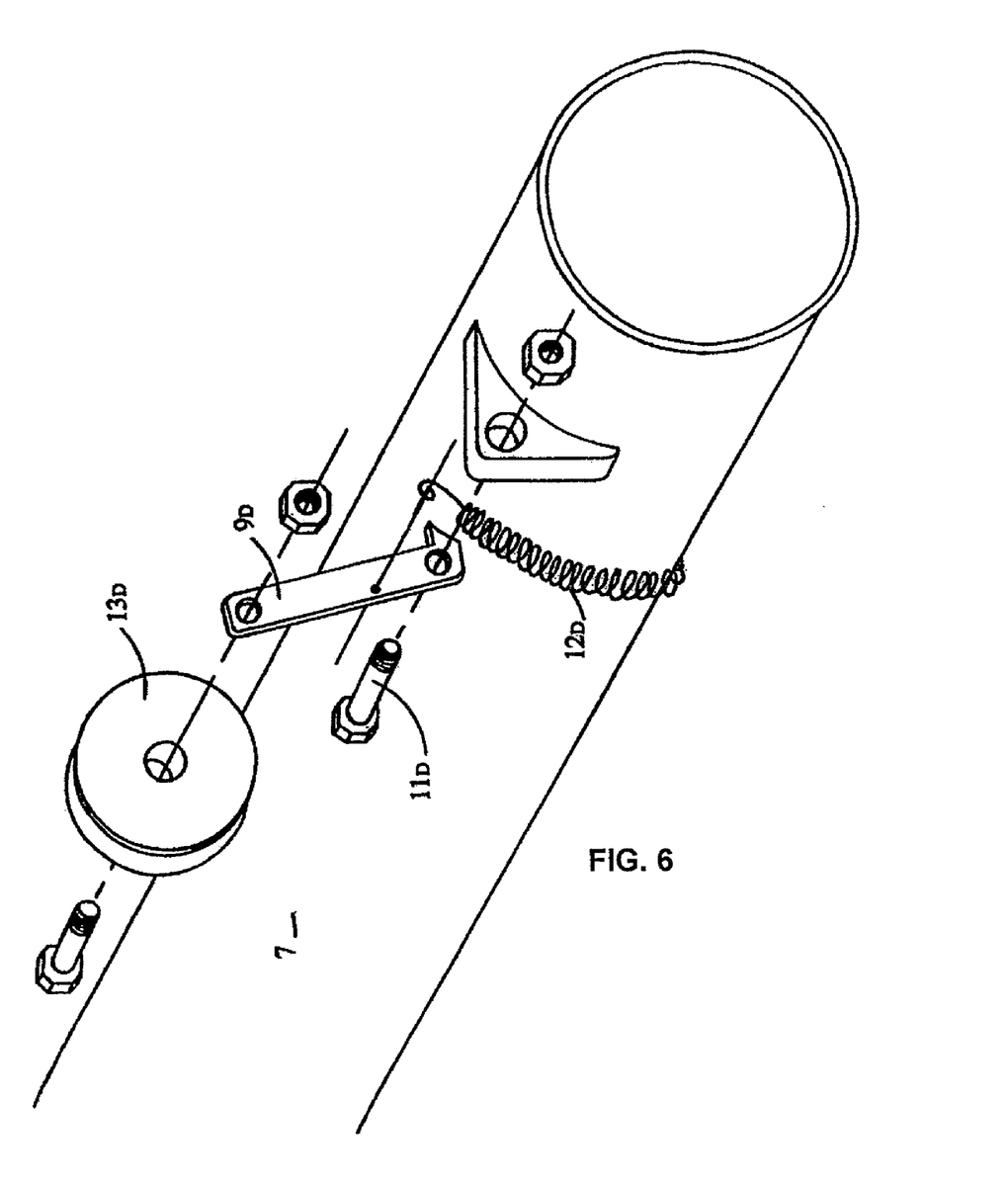
FIG. 6 shows a detail of the slider and oscillation system of the high frame on the front support.
Figure 7:
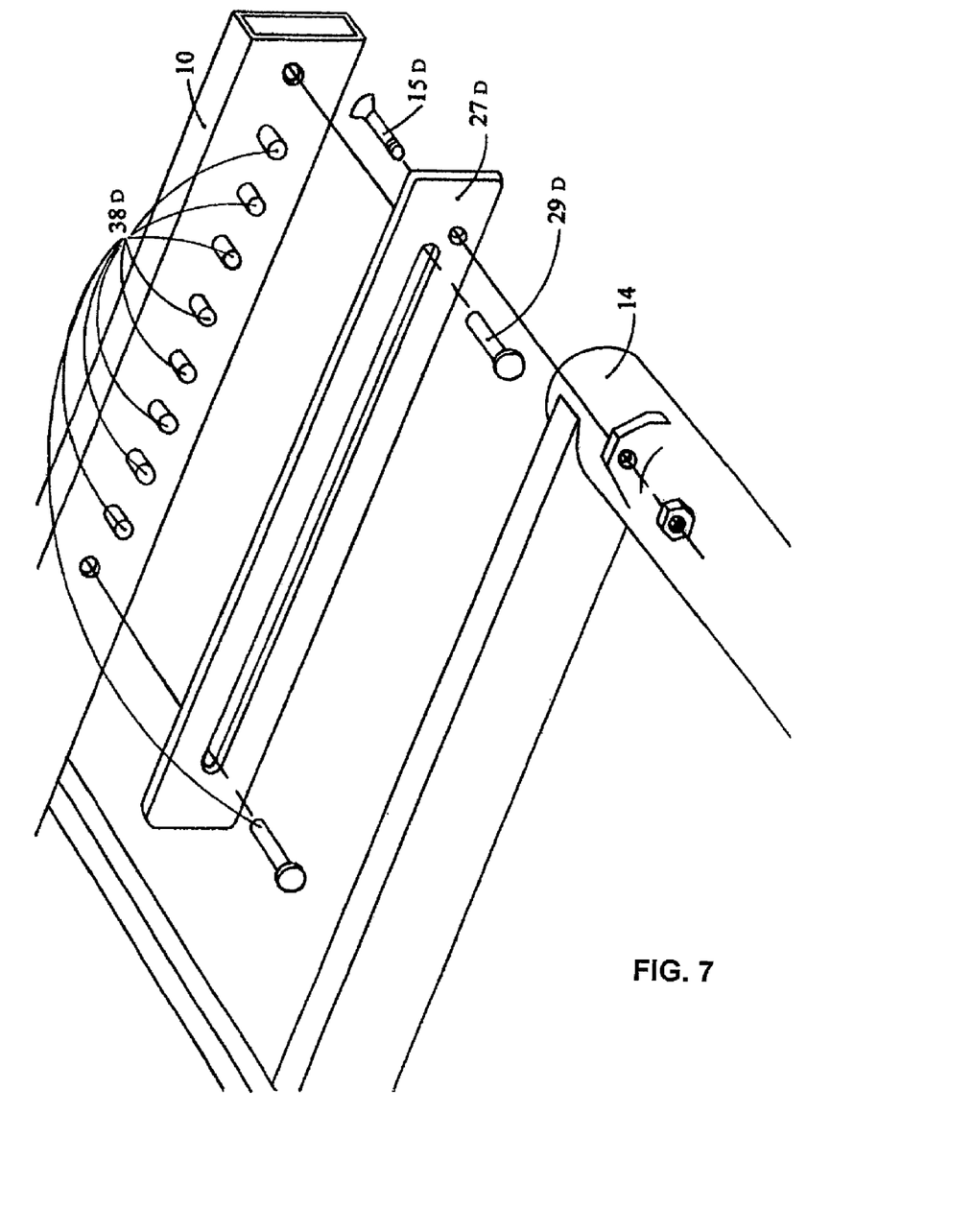
FIG. 7 shows a detail of the rear plate system enabling the high frame to slide by using kinetic energy.
Figure 8:
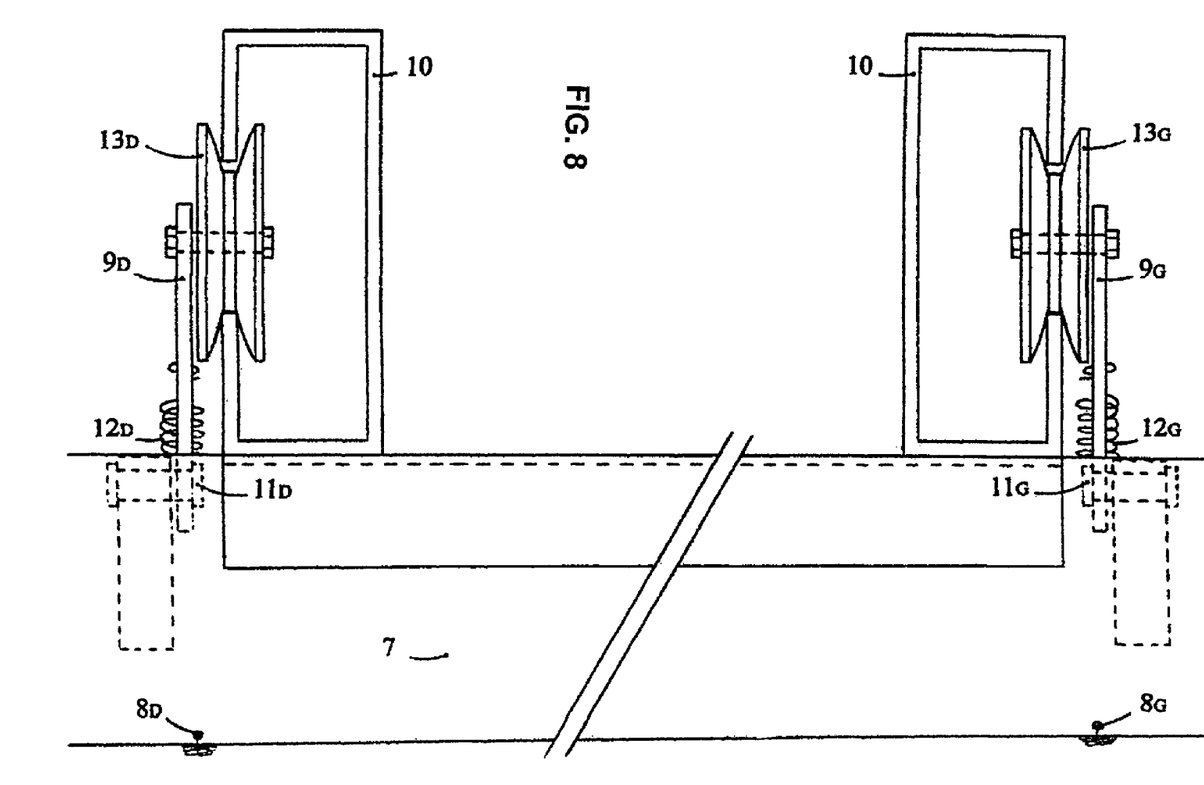
FIG. 8 shows a detail of the front system enabling the high frame to slide, the device being shown folded as seen from the front.
Figure 9:
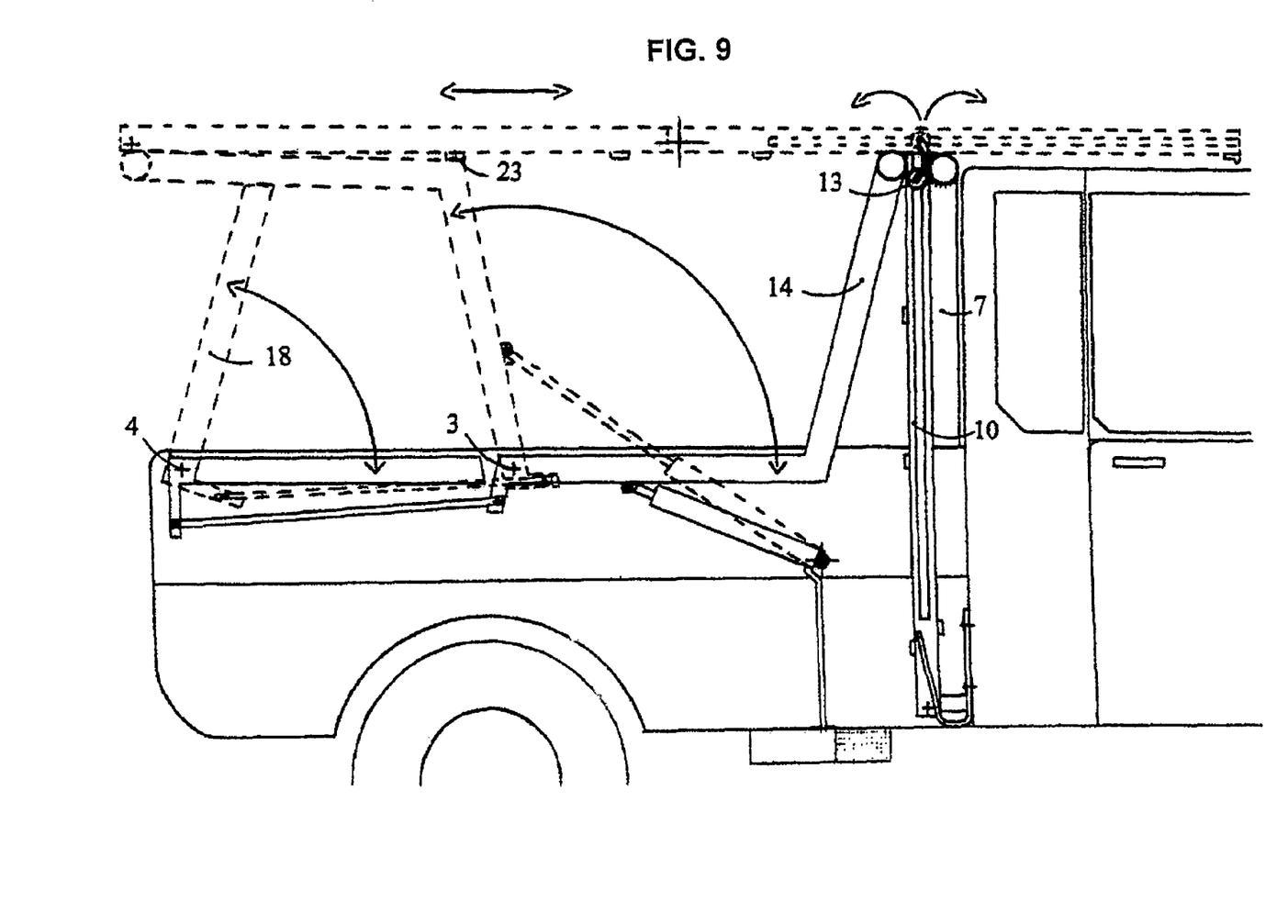
FIG. 9 shows the device seen from the side with two utilization positions shown in superposition, and also showing how the device moves.

Note: elements of the device that are identical in pairs are referenced by a numeral that may be associated with a letter G ("gauche"=left) or D ("droit"=right).

DETAILED DESCRIPTION OF PREFERRED EMBODIMENTS

With reference to the drawings, the device of the invention comprises:

A left plate (1) and a right plate (2) of length equivalent to the length of the bed body (6). These plates (1 and 2) are made of sheet steel folded to form an angle bar and they are screwed to the sides of the bed body (6) so that one flange bears against the edge of the bed body (6) and the other flange extends down into the bed body (6). The downwardly-directed flanges are pierced to receive the oscillation axes (3G and 3D) of the oscillating central support (14), the oscillation axes (4G and 4D) of the hinged rear supports (18GB and 18D), and the oscillation axes (5G and 5D) of the hydraulic actuators (21G and 21D), where all of the axes of the device are embodied by bolt-type pins.

A front support (7) that is made of round steel tube for the rectilinear central section, and of rectangular steel tube for the arms. It is welded via the ends of its arms to the bearing flanges of the plates (1 and 2). Two plates fabricated as flats that are used for fastening to links (9G and 9D) are welded to the central section of the front support (7). These plates are pierced so as to receive oscillation axes (11G and 11D). Holes (8G and 8D) are made in the central section of the front support (7) for inserting respective ends of springs (12G and 12D).

Two links (9G and 9D) of the front support (7) are made as flats that are pierced at each end to receive firstly hinged axes (11G and 11D) connecting them to the front support (7) and secondly to receive wheel axes (13G and 13D). These links (9G and 9D) are also pierced so as to enable the ends of the springs (12G and 12D) to be inserted therein. A projection situated at the end of each link (9G and 9D) constitutes an abutment that bears against the central section of the front support (7) when the frame (10) is in the horizontal position.

An oscillating central support (14) that is made of steel tube, that is round in its rectilinear central section, and rectangular in its arms. Two flat plates serve to fasten the rear of the high frame (10), being welded to the central section of the oscillating central support (14) perpendicularly to the axis of the tube. These plates are pierced so as to receive the oscillation axes (15G and 15D) connecting the sliding plate (27) to the central support (14). Each arm of the central support (14) is constituted by two tubes welded together to form an angle, the assembly serving to support the high frame (10) when the device is deployed. The ends of the arms are pierced so as to receive the oscillation axes (3G and 3D) connecting them to the support plates (1 and 2). A flat is welded under each of the ends of the arms of the oscillating central support (14) to constitute movement-relaying cranks. These flats are pierced so as to receive the oscillation axes (17G and 17D) connecting the links (16G and 16D) to the central support (14). The distance between the oscillation axes (3G and 3D) and the crank axes (17G and 17D) relaying movement from the central support (14) to the hinged rear supports (18G and 18D) is proportional to the strokes of these elements, so that these elements oscillate to become positioned together at the locations that are favorable thereto. A fastener plate for a hydraulic actuator (21G and 21D) is welded under each of the arms of the oscillating central support arm (14). These plates are made of flats and are pierced so as to receive the oscillation axes (26G and 26D) connecting them to the actuators (21G and 21D).

Two hinged rear supports (18G and 18D) serve to support the oscillating central support (14) when it is unfolded. They are made of rectangular steel tube and they are pierce at one of their ends to receive the oscillation axes (4G and 4D) connecting them to the plates (1 and 2). A flat is welded under each of the ends of the hinge rear supports (18G and 18D) to constitute movement-relaying cranks. These flats are pierced to receive the oscillation axes (19G and 19D) that connect them to the links (16G and 16D). The distance between the oscillation axes (4G and 4D) and the axes (19G and 19D) relaying movements from the rear supports (18G and 18D) to the central support (14) is proportional to the strokes of these elements so that these elements oscillate to be able to take up together the locations that are the most favorable thereto.

A frame (10) is made of rectangular tube and of angle iron. The tubes and the angle iron constituting the cross-members of the frame are welded to tubes that constitute the side members. The frame (10) is made up of two elements that fold one in the other, which elements are hinged together at one end and are pierced so as to receive the oscillation axes (22G and 22D) connecting together the two component elements thereof. The tubes constituting the side members of the front element of the high frame (10) are notched so as to form a profile in which the wheels (13G and 13D) are inserted. A cross-tube (23) of the rear element of the high frame (10) projects beyond the side members to bear against the oscillating central support (14) when the device is unfolded. The two side members of the rear element of the frame (10) are provided with a series of screws (38G and 38D) constituting breakable projections and one screw (29G and 29D) that is not breakable. The space occupied by the screws (38G and 38D+29G and 29D) corresponds to the area of oblong holes in the plates (27G and 27D). The screws situated at the ends of the oblong holes are provided with flat heads to sandwich the plates (27G and 27D). The screws (29G and 29D) leave sufficient clearance for the frame (10) to enable it to slide in the plates (27G and 27D). The screws (29G and 29D) situated at the ends of the side members are made of metal that is stronger than the metal of the other screws (38G and 38D) so that they cannot be cut.

Two plates (27G and 27D) are made of flats, and are pierced by respective holes for receiving the axes (15G and 15D) connecting them to the oscillating central support (14) and by respective oblong holes of length corresponding to the space occupied by the screws (38G and 38D+29G and 29D), and of width corresponding to the diameter of the screws (38G and 38D+29G and 29D).

Two wheels (13G and 13D) having respective conical grooves.

Two plates (24G and 24D) serve to hold the frame (10) when the device is folded. They are made out of flats folded into a kind of open-ended U-shape into which the tubes of the frame (10) engage. A rubber block (25G or 25D) is adhesively bonded to the bottom of each of the plates (24G and 24D), which plates are screwed to the bottom of the bed body (6).

Two hydraulic actuators (21G and 21D) are connected firstly to the oscillating central support (14) and secondly to the support plates (1 and 2).

An electrically-driven pump (28) powers the actuators (21G and 21D).

The device of the invention is particularly intended to facilitate making break and pickup vehicles versatile.

The invention claimed is:

1. A modulatable transport and protection device for a break or pickup type motor vehicle, the device being characterized in that it comprises a foldable structure mounted at the rear of the vehicle at substantially the height of the cab and comprising a central support (14) oscillating about a transverse axis (3) and connected by links (16) to rear supports (18) hinged on transverse axes (4), the central support (14)

being connected to the rear end of a high frame (10) capable of sliding and pivoting on a front support (7) between a vertical folded position behind the cab and a horizontal position deployed above the cab of the vehicle.

2. A device according to claim 1, characterized in that the high frame (10) is made up of two elements hinged together at one of their ends to be capable of folding one into the other in the vertical position.

3. A device according to claim 1 or claim 2, characterized in that the high frame (10) is guided on wheels (13) mounted on links (9) hinged to the front support (7) and retained by springs (12) exerting a downwardly-directed force.

4. A device according to claim 3, characterized in that each link (9) has a projection at its end constituting an abutment bearing against the front support (7) when the high frame (10) is in the horizontal position.

5. A device according to claim 1 or claim 2, characterized in that the high frame (10) has rear side members provided with a series of breakable screws (38) and a non-breakable screw (29) guided in oblong holes of hinge plates (27) on the central support (14) to provide a damping effect by shearing the breakable screws (38) in the event of a front impact.

6. A device according to claim 1 or claim 2, characterized in that two hydraulic actuators (21) are connected to the central support (14) and to plates (1, 2) fastened to the vehicle, these plates (1, 2) carrying the transverse axes (3, 4) of the central support (14) and of the rear supports (18).

7. A device according to claim 1 or claim 2, characterized in that it includes pegs for reinforcing movement of the high frame (10) on the front support (7).

* * * * *